April 5, 1938.    L. H. JUNKEN    2,113,405
ELECTROLYTIC CAPACITOR
Filed March 21, 1934
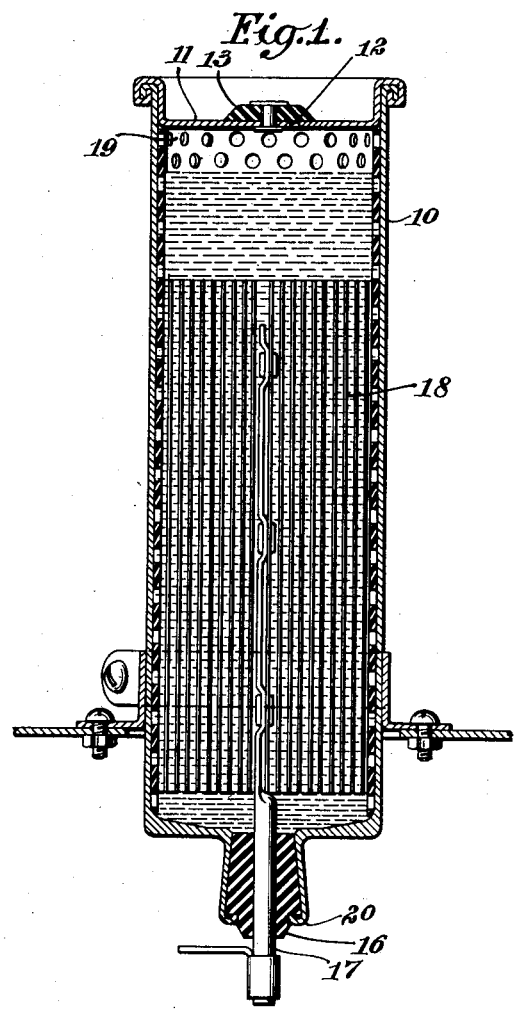
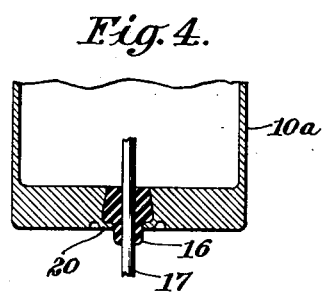
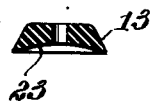
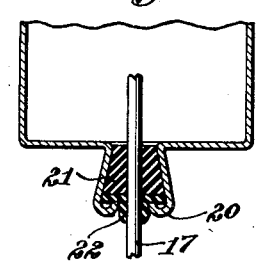
INVENTOR:
Lawrence H. Junken
BY [signature]
ATTORNEY.

Patented Apr. 5, 1938

2,113,405

UNITED STATES PATENT OFFICE 2,113,405

ELECTROLYTIC CAPACITOR

Lawrence H. Junken, Haddonfield, N. J., assignor to Radio Corporation of America, a corporation of Delaware Application March 21, 1934, Serial No. 716,568

4 Claims. (Cl. 175—315)

This invention relates to electric capacitors and the like, and more particularly to capacitors of the wet electrolytic type.

As is well known to those skilled in the art, a wet electrolytic capacitor of the type usually employed in radio receivers and like apparatus may be constituted by a container, usually of metal, such as aluminum, and a central filmed electrode immersed in a suitable electrolyte. If the capacitor is to be employed in a direct current circuit, the container ordinarily serves as the cathode and the central element is then the anode. Means are usually provided for suitably insulating the anode and the cathode from one another as by perforated insulating material formed into a cylindrical lining for the container. The container may be supported upon the instrument base in any well known manner.

Among the problems with which the manufacturer has been confronted heretofore is to provide a suitable electrolytic capacitor which is vented at the top so as to permit the escape of gases, should they generate too rapidly, and yet to form this vent in such manner that the electrolyte will not leak out in case the capacitor should be overturned.

Another difficulty heretofore encountered has been to provide leak-proof means for establishing an exterior connection electrically with the centrally disposed electrode.

Accordingly, it is among the objects of my invention to provide an electrolytic capacitor of simple construction which embodies improvements such as to overcome the difficulties hereinbefore mentioned.

Another object of my invention is to provide a novel structure for an electrolytic device in which the component parts are of such design as to be very cheaply manufactured and with a minimum of labor for assembly.

Another object of my invention is to provide a method of manufacture for electrolytic capacitors such that a compact, dependable and efficient product may be had.

In particular, it will be seen that my invention is carried out by providing a novel form of construction for the sealing and venting of the container at the top and in further providing a novel form of construction for the sealing and insulating of the central electrode terminal as it projects through an orifice at the bottom of the container.

The foregoing objects and other objects hereinafter to appear I prefer to carry out according to some one or another of the several specific forms presently to be described. It will be understood, however, that the modifications shown are illustrative only of many modifications which would be suggested by this specification to those skilled in the art. The details of the invention will best be understood from the following description taken in connection with the accompanying drawing, wherein Fig. 1 is a cross-sectional view of one form of my electrolytic capacitor;

Fig. 2 is a view of the vent cap as it would appear before assembling with the container cover;

Fig. 3 is a cross-sectional view of a modified form of vent cap;

Fig. 4 is a cross-sectional view of a modified form of the container bottom; and Fig. 5 is a view of another modification wherein the resilient stopper may be reinforced by a hard washer having a nub about its hole.

In Fig. 1 I have shown a container 10 which may preferably be formed into a cylindrical cup having a flat bottom and a tapered bottle neck at the bottom. Aluminum is generally used because it is a low-cost material and easily fabricated. The formation at the top of the cylindrical portion is made such that the edge may be joined with that of a cover member 11, and folded into a seam. In this seam, a sealing compound, such as rubber latex, may be used, if desired, so as to make the joint leak-proof. Fig. 1 shows very clearly the preferred manner of crimping these elements together to make a leak-proof seal.

The cover member 11 is blanked with a small rivet hole. Closely adjacent thereto is a still smaller vent hole 12. A vent cap or button 13 such as shown in Fig. 2 and made of resilient material, such as rubber, is then riveted in place on the cover member. The riveting operation is such that the cap is firmly squeezed against the metal of the cover member 11 thereby closing the vent hole 12. The seal thus formed is rendered more effective by virtue of the originally concave surface 23 of the cap, which surface is, of course, flattened by the riveting operation. In case, however, gases should form within the container, the gas pressure will be sufficient to temporarily lift the vent cap 13 thus allowing the escape of the gases.

According to the modification of my invention shown in Fig. 3, the cover member 11 is provided with only one hole to be used as a vent, no rivet hole being necessary. In this case the vent cap 14 is of somewhat different formation from that shown in Fig. 2 in that it preferably has at least one nipple for more effectively sealing the vent hole. A resilient clamp spring 15 may be provided with hooked ends for snapping the same over the edges of the container tube. This clamp is provided with a hole at the middle whereby the resilient vent cap 14 may be suitably held in place. It is preferable, therefore, that this vent cap 14 be provided with another nipple, or button, to engage in the hole of the retaining clip 15.

Referring again to Fig. 1, it will be seen that the container proper is made at the bottom with a sort of bottle neck into which a stopper 16 of resilient material may be inserted. The inner walls of the bottle neck are tapered in order that as the resilient stopper 16 is forced in it may be made to fit tightly. The stopper is tapered the same as the bottle neck but having larger diameters. It is provided with a central hole for the central electrode terminal 17, and a nub which serves to more effectively insulate the terminal 17 from the bead 20 on the bottle neck.

As is usual in the construction of electrolytic devices of this type, the central electrode may be made of thin sheet aluminum pleated, folded or rolled up into a compact unit 18 and surrounded by an insulating member 19 which lines the cylindrical walls of the container. The sheet of which the central electrode is made is riveted to a central post or riser 17 by which it is supported, this post 17 also constituting the terminal which projects through the resilient stopper. After assembly of the anode with its riser, this partial assembly may be subjected to any well known process for forming a dielectric film thereon.

The manner of assembling the units of my improved capacitor is believed to be novel. After forming each of the elements ready for assembly, the assembly operation comprises inserting the insulator 19 within the container 10, inserting the partial assembly of pleated or spiral wound sheet material 18 for the anode electrode with its supporting post 17 extending through the bottle neck of the container. The resilient stopper 16 is then forced over the rod-like portion of the electrode terminal, or post 17, and pushed into the bottle neck. The riser 17 goes with the stopper, thus lifting the anode a suitable distance above the bottom of the container. The stopper is somewhat elongated under the lateral compression. The hole in the stopper is thus constricted and forms an effective leak-proof seal about the electrode terminal. The edge 20 of the container neck is crimped or beaded over the stopper as shown. The stopper 16 then becomes non-removable.

Next the electrolyte may be poured into the container. The cover 11 with its vent cap 13 already riveted in place is then fitted on. The folding and interlocking of the edges of the cylindrical container 10 and of the cover member 11 are finally accomplished. Rubber cement may be applied to the seam just before completing this last operation.

Referring now to Fig. 4, I show a modified cylindrical container 10a in which, due to the thickness of the wall at the bottom thereof, I am enabled to do away entirely with the bottle neck portion of the container hereinbefore described in connection with Fig. 1. The method of assembly in case this modification is used is substantially the same as that previously described. The stopper 16 is forced over the rod-like portion of the central electrode terminal 17 and forced into the tapered hole. The stopper 16 may then be permanently secured in place by forming a bead 20 thereover as shown.

In Fig. 5, a modification is shown which is very similar to that of Fig. 1, but with this difference, that the resilient stopper 21 is forced into the bottle neck sufficiently to permit of following it up with a hard washer 22 preferably molded of bakelite or other suitable insulating material and having a nub on it. The edges of the bottle neck are then formed into a bead 20 over this hard washer.

Other modifications of my invention and other methods of assembly of the electrolytic capacitors may suggest themselves to those skilled in the art. It will be apparent that the spirit of my invention may be carried out in the making and using of other electrolytic devices such as rectifiers. I do not, therefore, intend to restrict myself to any specific embodiments or methods except as may be required in view of the prior art. In accordance with the foregoing description, it will be clear that I have provided an electrolytic device having a structure of highly advantageous and simplified character and one which can be manufactured under favorable conditions for low cost production in large quantities. My capacitor has been found to be extremely efficient from the standpoint of durability and operation. It is neat in appearance and fits into the usual assembly of radio apparatus units in a very satisfactory manner. The central electrode terminal is conveniently positioned at the bottom of the container so that the wiring connection may be made below the floor of the radio chassis.

I claim as my invention:

1. In an electrolytic capacitor, a container of conducting material adapted to serve as one electrode and having at one end thereof a reduced, tapered orifice the inner end of which is of smaller diameter than the outer end, a complementary electrode in said container, a rod supporting said complementary electrode and extending through said orifice to form an outer terminal, a resilient stopper of insulating material wedgingly forced into said orifice and constricted about said rod so as to fill said orifice, said stopper having an outer shoulder, an electrolyte in said container, and means including a beaded portion of said container rolled inwardly over said shoulder for permanently sealing said electrolyte within said container.

2. An electrolytic capacitor comprising two electrodes and a liquid electrolyte, one of said electrodes serving as a container for the electrolyte, and the other of said electrodes being submersed in said electrolyte and having a rod-like portion extending outwardly of said container, a sleeve of resilient insulating material surrounding said rod-like portion where it extends outwardly of the container-electrode, said container-electrode terminating in a reduced, tapered portion providing a tapered orifice the exterior end of which has the greater diameter, and means including a part of said reduced portion beaded over said sleeve for permanently retaining said sleeve in said orifice.

3. A device in accordance with claim 2 in which said sleeve is formed with a nub extending outwardly from the beaded portion of said container-electrode.

4. A device in accordance with claim 2 in which a washer of hard insulating material is provided and is held in place in said orifice between said sleeve and the beaded portion of said container-electrode, and in contact with said beaded portion.

LAWRENCE H. JUNKEN.